Feb. 11, 1964 R. J. HULL 3,121,056
METHOD AND APPARATUS FOR STABILIZING NATURAL GASOLINE
Filed Aug. 1, 1960
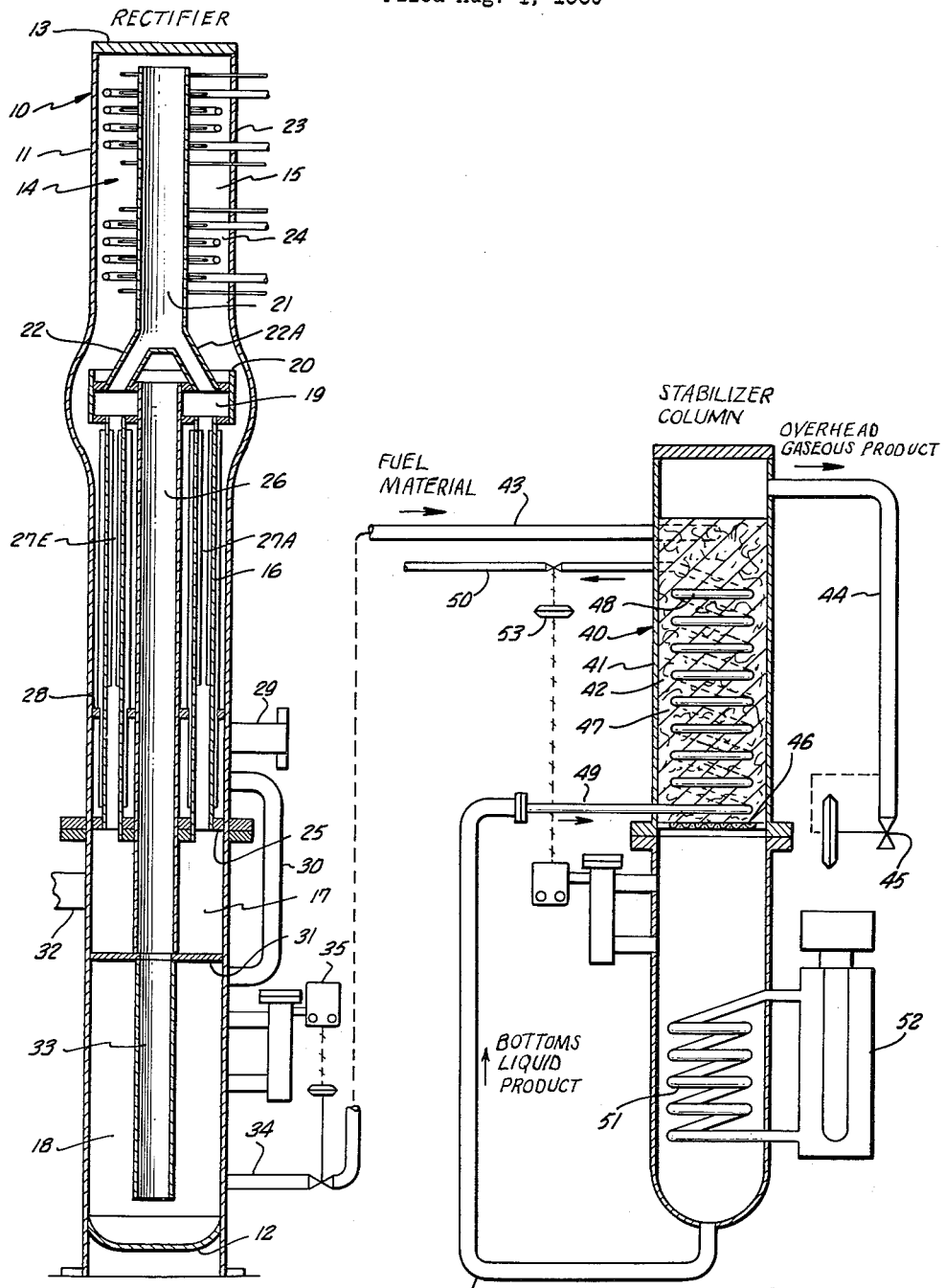
INVENTOR.
RAYMOND JAMES HULL
BY
Christie, Parker & Hale
ATTORNEYS.

United States Patent Office 3,121,056
Patented Feb. 11, 1964

3,121,056
METHOD AND APPARATUS FOR STABILIZING NATURAL GASOLINE
Raymond James Hull, Orange, Calif., assignor to Gas Processing Inc., Fullerton, Calif., a corporation of California
Filed Aug. 1, 1960, Ser. No. 46,817
2 Claims. (Cl. 208—365)

This invention relates to natural gasoline treatmtent and particularly to apparatus for improving fractionation and heat economy in the treatment of natural gasoline removed from natural gas. It also relates to a process for the treatment of natural gasoline whereby improved fractionation and improved heat economy are achieved in stabilizing natural gasoline.

The term "natural gas" refers to the gaseous mixture of hydrocarbon compounds produced from subterranean reservoirs. Such gas, particularly when found underground in association with oil, contains relatively large amounts of hydrocarbon constituents higher in molecular weight than propane and, in such state, is called wet natural gas. The wet gas may be processed to yield two products, one being "casinghead gas" or "natural gasoline," a liquid product composed of the more readily condensable hydrocarbons in the wet gas, and the other being dry natural gas. In addition, natural gas, as obtained at the well-head of a producing well, frequently contains condensable water.

The presence of condensable constituents in natural gas as it is produced requires that the gas be treated before it is placed in gas transmission systems. Otherwise, condensation of liquids occurs within pipelines with a consequent adverse effect on operations of the transmission system. In addition, the presence of both condensable hydrocarbons and water can result in the formation of gas hydrates within the pipeline with resultant reduction in the flow capacity of the transmission system. Natural gasoline is itself a valuable product so that its removal prior to sale of the natural gas is of economic benefit to the producer.

The processes for treating natural gas generally used in conventional treating plants may be classified either as an absorption process or as a low-temperature recovery process.

The absorption process is particularly used in large capacity installations. After compression and cooling of the wet natural gas to condenser water temperature, hydrocarbon constituents are removed from the natural gas by a suitable absorption solvent. Removal of water from the gas requires the use of dehydrating agents such as the glycols.

The low-temperature recovery process, while better adapted for small capacity installations, involves compression of the gas followed by cooling to low temperatures and, generally, simultaneous treatment with dehydrating agents. A regenerative cycle to recover the dehydrating agent must be included as part of such a process.

The expense of conventional gas treating plants causes many instances to arise where natural gas is wasted by venting to the atmosphere or it is not produced because the installation of a treating plant cannot be economically justified. This particularly occurs where the discovered gas reservoir is small in size, or its location is remote, or the true capacity of the reservoir has not been sufficiently defined to show an economic balance in favor of a treating plant. Even though gas transmission facilities are available, the untreated natural gas cannot therefore be marketed.

In my copending application Serial No. 701,581, filed December 9, 1957, now Patent 2,964,915, I disclosed a novel refrigerating rectifier for treating natural gas to remove both water and condensable hydrocarbons. This refrigerating rectifier makes it possible to carry out the maximum number of steps for treating natural gas within a single unit. As a result, the cost of the treating equipment is reduced and it becomes possible to treat natural gas under circumstances which preclude installation of large conventional gas treating plants.

The passage of wet natural gas through the refrigerating rectifier disclosed in the above-identified copending application results in the removal of both water and condensable hydrocarbons from the wet gas so that a dry natural gas, suitable for pipeline transmission, is produced. Furthermore, the hydrocarbons, condensed from the wet gas, are fractionated and stripped of some of the light, high vapor-pressure components, namely, methane, ethane, and propane, within the rectifier by utilizing the heat of the incoming feed gas. It is, however, frequently necessary to stabilize the liquid hydrocarbon product or natural gasoline thus obtained by further treatment in a stabilizer column.

The apparatus of my present invention relates to stabilizer columns. In the treatment of natural gasoline removed from natural gas, the stabilizer column acts to stabilize the natural gasoline before it is sent to storage by removing substantially all of the low molecular weight hydrocarbons remaining in the natural gasoline. Within the stabilizer column, all of the methane, most of the ethane, and part of the butane and propane are removed from the natural gasoline.

In conventional stabilizer columns, such as the one described in conjunction with the refrigerating rectifier disclosed in my copending application, a reboiler in the bottom of the stabilizer column supplies the heat necessary to vaporize the desired amount of low molecular weight hydrocarbons from the liquid state. The overhead gaseous product of low molecular weight hydrocarbons is removed from the top of the stabilizer column, and the heated stabilized liquid bottoms production in the bottom of the stabilizer column is removed at its elevated bottoms temperature. I have found that the fractionation of natural gasoline and the heat economy within the stabilizer column can be markedly improved by utilizing the heat of the liquid bottoms product to heat the fractionation zone within which the natural gasoline is treated in the stabilizer column before the stabilized bottoms product is sent to storage.

The stabilizer column of my invention includes an elongated shell closed at its longitudinal ends to form an enclosure. A liquid feed inlet is located near the top of the shell for admitting natural gasoline to the enclosure. A gas outlet near the top of the shell removes overhead gaseous hydrocarbons produced during the stabilization of the natural gasoline. A first means is located within the enclosure below the feed inlet and acts to distribute the downward flow of natural gasoline. The first means may be packing materials of the kind conventionally employed in stabilizer columns. Means are provided within the enclosure and near its bottom for heating the natural gasoline. Heat exchanging means, positioned within the first means, is connected to a liquid outlet near the bottom of the shell for removing hot liquid bottoms product from the enclosure. The heat exchanging means is adapted so that the heated liquid bottoms product passes through it interiorly in indirect heat exchange relationship with the downwardly flowing natural gasoline before the bottoms product is passed to storage.

The process of my invention for stabilizing natural gasoline includes the step of continuously passing liquid natural gasoline downwardly in direct counter-current heat exchange relationship with heated vaporized components of natural gasoline. This fractionates the liquid natural gasoline and the vaporized components to produce a liquid bottoms product and an overhead gaseous product of light weight hydrocarbons. Heat is added to the liquid bottoms product to vaporize components of the natural gasoline. The heated liquid bottoms product is continuously removed and passed in indirect heat transfer relationship with the natural gasoline downwardly flowing within the stabilizer column.

A particular feature of the apparatus and process of my invention is that the heated bottoms product is passed in indirect heat exchange relationship with a downwardly flowing feed material which is being fractionated. This makes use of the heat in the bottoms product which must in all events be cooled before it is sent to storage. As a result, the heat requirements for the stabilizer column are reduced. Furthermore, since the heat is added in the fractionation zone of the column, an improvement in fractionation is obtained because the temperature at any given point within the fractionation zone is higher than it would be in the absence of the heat provided by the apparatus and process of my invention.

The apparatus and process of my invention may be utilized in the stabilization of natural gasoline obtained by various methods of treatment of natural gas. However, the apparatus and process can be used advantageously in conjunction with the refrigerating rectifier disclosed in my above-identified copending application. While it will be understood that the use of the apparatus and process of my present invention is not to be limited thereby, these are described below with reference to natural gasoline obtained through the use of the refrigerating rectifier described in said application.

Both the apparatus and process of the present invention will be more clearly understood from the following description made in conjunction with the accompanying drawing which is a sectional elevation of the stabilizer column of the present invention shown in conjunction with a refrigerating rectifier.

With reference to the drawing, a refrigerating rectifier 10 comprises an elongated vertical shell 11 which is conveniently assembled in three sections, the sections being joined together by flanges. A lower internal cap 12 joined to the inside wall of the shell near the bottom of the rectifier, an upper external cap 13 joined to the top of the rectifier and the shell define a fluid-tight enclosure 14 extending substantially the entire length of the rectifier.

For descriptive purposes, it is convenient to consider the enclosure as subdivided into four sections, which are designated as a refrigerating section 15, a pre-cooling section 16, a gas outlet section 17, and a liquid-collecting section 18.

The refrigerating section is bounded at its upper longitudinal end by the upper external cap of the rectifier and at its lower longitudinal end by a gas distribution header 19. The gas distribution header is a doughnut-shaped member with a hollow interior. Its outside diameter is less than the inside diameter of the shell. An annular space for the passage of fluids is defined between the outer wall of the header and the inner wall of the shell. To avoid excessive pressure drops and cooling of the flowing gas as occurs during flow through small orifice areas, the shell in the preferred embodiment is belled outwardly to provide an adequate cross-sectional area for the flow of fluids. The upper side of the gas distribution header can be downwardly inclined toward the hole of the doughnut to improve liquid drainage. A strip 20 is joined to the periphery of the header on the upper side to facilitate collection of liquid condensate.

A gas downcomer 21 is disposed coaxially with the shell and centrally within the refrigerating section. The gas downcomer is a pipe open at the top and capped at the bottom and has an outside diameter substantially less than the inside diameter of the shell. The gas downcomer is supported by three tubes 22, 22A, and 22B, the latter not being shown, extending laterally and downwardly from near the bottom of the downcomer to the top of the gas distribution header. The tubes provide means for flow of fluids from the interior of the downcomer into the interior of the gas distribution header.

An upper refrigerating system 23 and a lower refrigerating system 24, each system being joined to separate refrigeration units located exteriorly of the rectifier, are disposed in the refrigerating section of the rectifier within the annular space formed between the gas downcomer and the inner wall of the shell. The refrigeration systems shown in the embodiment of the refrigerating rectifier here described each include an outer helically-wound coil and an inner helically-wound coil. This arrangement of the refrigeration coils has been found advantageous since maximum heat transfer is attained with minimum plugging of the flow channels between the coils due to gas hydrate formation. A conventional refrigerant flows through each of the coils.

The pre-cooling section of the rectifier is bounded at its upper longitudinal end by the gas distribution header and at its lower end by a tube sheet 25. The periphery of the tube sheet is joined to the inner wall of the shell thereby sealing this section from the lower sections of the rectifier. A liquid downcomer 26 is disposed coaxially with, and centrally within, the shell. At its upper end, the liquid downcomer passes through the gas distribution header and terminates on the upper side of the header. The liquid downcomer centrally passes through the tube sheet, a fluid-tight seal being formed between the outer wall of the downcomer and the tube sheet.

A plurality of heat exchanger tubes 27, 27A, 27B, 27C, etc., are arcuately spaced in the annular space within the pre-cooling section formed between the liquid downcomer and the inner wall of the shell. The upper end of each tube is joined to the bottom side of the gas distribution header so as to connect the interior of the header with the interior of the tube. The lower end of each tube passes through the tube sheet and terminates on the bottom side of the tube sheet. A fluid-tight seal is formed between the exterior of each tube and the tube sheet. Between the gas distribution header and the tube sheet, the tubes pass through a baffle plate 28. The baffle plate is located slightly above a feed gas inlet pipe 29 and acts to distribute the incoming feed gas throughout the annular space of the pre-cooling section. The heat exchanger tubes pass through holes in the baffle plate, the holes being slightly larger in diameter than the outside diameter of the tubes. The feed gas passes through these annular spaces between the tubes and the baffle plate since the baffle plate is sealed at its outer diameter to the inner wall of the shell and at its inner diameter to the outer wall of the liquid downcomer. The flow area may be increased by providing an annular opening between the baffle plate and the shell. The flow area required may be easily calculated as a function of the feed gas throughout.

A liquid level pipe 30 is fitted through the shell at a point slightly above the tube sheet and below the feed gas inlet pipe. It externally connects the lower portion of the pre-cooling section and the liquid collecting section of the rectifier and maintains a constant liquid level within the former section.

The gas outlet section of the rectifier is bounded at the upper longitudinal end by the tube sheet and at the lower longitudinal end by a support plate 31. The periphery of the support plate is joined to the inner wall of the shell thereby sealing this section from the liquid collecting section below. The liquid downcomer passes centrally through the support plate and terminates on its bottom side. A gas outlet pipe 32 extends through the shell and connects the gas outlet section with an external dry gas storage or transmission facilities. As previously described, the bottom ends of the heat exchanger tubes terminate on the bottom side of the tube sheet so that any fluid flowing downwardly through the heat exchanger tubes is discharged into the gas outlet section.

The liquid collecting section is bounded at the upper longitudinal end by the support plate and at the lower longitudinal end by the lower internal cap. As previously described, the liquid downcomer passes centrally through the support plate so that liquid condensate drains into the liquid collecting section. For convenience, a drain pipe 33, having a smaller diameter than the downcomer, depends into the section. The liquid level pipe permits any liquids condensed within the pre-cooling section to drain into the liquid collecting section. A liquid outlet pipe 34 is fitted through the shell near the bottom of the liquid collecting section. A level control valve 35 is also provided in this section.

The stabilizer column of the present invention for the stabilization of liquid hydrocarbon products produced in the treatment of wet natural gas by the rectifier is generally identified by reference character 40. It includes an outer shell 41 suitably closed at top and bottom to form a fluid-tight enclosure 42 extending the entire length of the column. A stabilizer liquid feed inlet pipe 43 is fitted through the shell near the top of the column. Liquid feed inlet pipe 43 is connected to liquid outlet pipe 34 from the bottom of the refrigerating rectifier. A stabilizer gas outflow pipe 44, equipped with a pressure relief valve 45, is also fitted through the shell near the top of the column. A support ring 46, joined to the inner wall of the shell at a point approximately midway of the length of the column, provides a bottom support for packing 47, such as saddles or Raschig rings, which substantially fills the upper one-half of the enclosure.

The center of support ring 46 is adapted through the use of perforations or screening to enable free flow of fluids through it.

A heat exchanger 48 is positioned within the packing. The heat exchanger may conveniently be in the form of a helical tubular coil, as shown in the drawing, with an inflow end 49 and an outflow end 50 passing through outer shell 41 of the stabilizer column.

A heater or reboiler 51 is placed near the bottom of the enclosure and is connected to an external heating means 52 such as an electric boiler. A liquid level control device 53 is fitted through the shell so as to maintain the liquid level within the enclosure above the top of the reboiler.

A liquid outlet pipe 54 is fitted through the shell at the bottom of the enclosure. The liquid outlet pipe 54 from the bottom of the stabilizer is connected to inflow end 49 of helical coil 48 within the packing. In order to minimize heat losses, outlet pipe 54 and the portion of helical coil 48 exterior of the shell are thermally insulated.

The operation of the stabilizer column of the present invention in the stabilization of natural gasoline and the nature of the process of the invention will be understood by tracing the flow of wet natural gas through the embodiment of the rectifier previously described and by tracing the flow of natural gasoline through the stabilizer column. For convenience of description, the treatment of the gas and the liquid condensation products, both water and hydrocarbons, will be separately considered even though such treatment occurs simultaneously during flow through the rectifier and stabilizing column.

A wet natural gas passes through feed gas inlet pipe 29 and enters the pre-cooling section of the rectifier where it is distributed uniformly throughout the annular space of that section by the baffle plate. The gas flows upwardly around the heat exchanger tubes, then through the annular space between the gas distribution header and the inner wall of the shell, and upwardly around the refrigerated coils of the refrigerating section. At the top of the refrigerating section, the gas has been cooled and dehydrated to the maximum extent reached during the treatment. The gas then flows successively downwardly through the gas downcomer, and, after being distributed in the gas distribution header, through the heat exchanger tubes into the gas outlet section. From the gas outlet section, it passes through the gas outlet pipe of the rectifier to storage or gas transmission facilities.

Liquid condensation occurs in both the pre-cooling section and the refrigerating section. In the pre-cooling section, the condensed hydrocarbon constituents and water are collected on the top of the tube sheet and overflow into the liquid collecting section through the liquid level pipe. The hydrocarbon constituents are condensed throughout the length of the pre-cooling section and flow downwardly counter to the upflowing warm wet feed gas. As a result, a continuous process of fractionation and stripping occurs by which the high vapor-pressure components are stripped from the hydrocarbon condensate.

The hydrocarbon constituents condensed in the refrigerating section are collected on the upper surface of the gas distribution header. The small amount of water condensed in this section clings to the refrigerating coils as a hydrate. The hydrocarbon liquid flows downwardly by gravity through the liquid downcomer into the liquid collecting section. The downflowing liquid flows as a film along the inner wall of the downcomer, thereby promoting maximum heat transfer efficiency. Since the liquid downcomer is externally surrounded by the upflowing warm feed gas, a heat exchange occurs through the wall of the downcomer between the gas and the film of condensed liquids. In this manner, high vapor pressure components are removed from the downflowing hydrocarbon condensate while the upflowing feed gas is simultaneously cooled.

For stabilization of the hydrocarbon condensate or natural gasoline collected in the bottom of the refrigerating rectifier, the liquid products flow from the liquid collecting section of the rectifier through liquid outlet pipe 34 and enter the top of the stabilizer column through liquid feed inlet pipe 43. As the natural gasoline flows downwardly through the packing in the upper portion of the stabilizer column, it passes in direct counter-current heat exchange relationship with upwardly flowing hot vapors produced by heating of the liquid in the bottom of the stabilizer column. Furthermore, both the natural gasoline and the vapors are further heated within the packing by reason of indirect heat transfer between them and the hot bottoms liquid product circulated within heat exchanger 48, as will be more fully explained below. The natural gasoline and the vapors are fractionated to produce a gaseous overhead product of low molecular weight hydrocarbons and a liquid bottoms product of stabilized natural gasoline.

The heated liquid bottoms product or stabilized natural gasoline leaves the stabilizer column through liquid outlet pipe 54 and circulates interiorly through heat exchanger 48. The cooled stabilized natural gasoline leaves the heat exchanger through outflow end 50 and is passed to storage or distribution. The overhead gaseous products leave the top of the stabilizer column through gas outflow pipe 44 and are recycled through the refrigerating rectifier with the feed gas. No recycling of the overhead gaseous products back into the stabilizer column is required.

The advantages of the apparatus and process of the present invention will be apparent from the following example. In the table below, column I represents the mol percent of hydrocarbon constituents in natural gasoline entering the stabilizer column of the present invention. The pressure within the stabilizer column was 50 p.s.i.g. and the reboiler temperature was 140° F. Only 12 feet of 1-inch packing was used. Column II represents the mol percent of hydrocarbon constituents in the stabilized natural gasoline leaving the stabilizer column.

Table

| Hydrocarbon Constituent | Mol Percent | |
|---|---|---|
| | Col. I | Col. II |
| Methane | 7.7 | 0.00 |
| Ethane | 6.3 | 0.06 |
| Propane | 21.0 | 10.42 |
| Butanes | 29.1 | 35.21 |
| Pentanes and heavier | 35.9 | 54.31 |
| Total | 100.0 | 100.00 |

It will be seen from the table that a substantially ethane-free stabilized natural gasoline was obtained. As compared to a conventional stabilizer column, the heat required to stabilize the natural gasoline was 46% less in the stabilizer column of my invention. Furthermore, as shown in the above table, the ratio of propane to ethane was approximately 174:1 following stabilization in the column of my invention. By treatment of the same natural gasoline in a conventional column, the ratio of propane to ethane was in the range from 20:1 to 50:1.

The above example demonstrates the improved fractionation and heat economy achieved through the use of the stabilizer column of my invention and the practice of the process of my invention.

It will be understood that the description of the apparatus and process of my invention with reference to natural gasoline does not limit the applicability of either to this specific feed material. As will be apparent to those skilled in the art, the apparatus and method may be advantageously used for fractionation of other feed materials.

I claim:

1. A process for stabilizing natural gasoline by removing low molecular weight hydrocarbons comprising the steps of downwardly flowing and continuously distributing liquid natural gasoline throughout a substantial vertical length within a column, passing heated vaporized components of the natural gasoline in direct countercurrent heat exchange relationship with the liquid natural gasoline to fractionate the natural gasoline and its vaporized components to produce a liquid bottoms product and an overhead gaseous product of low molecular weight hydrocarbons, removing the overhead gaseous product without recycling of said product into the column, adding heat to the liquid bottoms product to vaporize components of the natural gasoline, and continuously removing the liquid bottoms product and passing it in indirect heat transfer relationship with the downwardly flowing natural gasoline throughout said substantial vertical length.

2. A stabilizer column for stabilizing natural gasoline by removing low molecular weight hydrocarbons from liquid natural gasoline comprising an elongated vertical enclosure having a top and a bottom, an inlet near the top of the enclosure for admitting natural gasoline to the enclosure, a gas outlet near the top of the enclosure for removing overhead gaseous products, a packing within the enclosure extending downwardly from said inlet by a vertical length for distributing over the vertical length of the packing natural gasoline flowing downwardly from said inlet toward the bottom of the enclosure, heater means inside the enclosure near the bottom thereof for heating the natural gasoline accumulating at the bottom of the enclosure, heat exchanger means extending substantially throughout the vertical length of said packing, and means for circulating the liquid natural gasoline heated at the bottom of the enclosure through said heat exchanger means in indirect heat transfer with the downwardly flowing natural gasoline.

References Cited in the file of this patent

UNITED STATES PATENTS

| | | |
|---|---|---|
| 1,713,255 | Brandt | May 14, 1929 |
| 2,064,757 | Keith | Dec. 15, 1936 |
| 2,294,547 | Gerhold et al. | Sept. 1, 1942 |
| 2,348,681 | Houghland | May 9, 1944 |
| 2,995,499 | Dukler et al. | Aug. 8, 1961 |